(12) United States Patent
Tateno

(10) Patent No.: US 10,280,808 B2
(45) Date of Patent: May 7, 2019

(54) RANKINE CYCLE SYSTEM FOR VEHICLE

(71) Applicant: TOYOTA JIDOSHA KABUSHIKI KAISHA, Toyota-shi, Aichi-ken (JP)

(72) Inventor: Manabu Tateno, Shizuoka-ken (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/337,385

(22) Filed: Oct. 28, 2016

(65) Prior Publication Data

US 2017/0175588 A1 Jun. 22, 2017

(30) Foreign Application Priority Data

Dec. 16, 2015 (JP) ................................. 2015-244961

(51) Int. Cl.
*F01K 23/06* (2006.01)
*H02K 7/18* (2006.01)
*F01K 23/10* (2006.01)

(52) U.S. Cl.
CPC ............ *F01K 23/065* (2013.01); *F01K 23/10* (2013.01); *F05D 2220/62* (2013.01); *H02K 7/1823* (2013.01)

(58) Field of Classification Search
CPC .... F01K 23/065; F01K 23/10; F05D 2220/62; H02K 7/1283; Y02T 10/166
(Continued)

(56) References Cited

U.S. PATENT DOCUMENTS 3,350,876 A * 11/1967 Johnson .................. F01K 23/14
60/618
4,300,353 A * 11/1981 Ridgway ................. F01K 23/14
60/618
(Continued)

FOREIGN PATENT DOCUMENTS

CN 102812211 A 12/2012
CN 203547951 U 4/2014
(Continued)

OTHER PUBLICATIONS

United Sates Patent and Trademark Office, Non-Final Office Action dated Apr. 4, 2018 in U.S. Appl. No. 15/335,987, 10 pages.
(Continued)

*Primary Examiner* — Mark A Laurenzi
*Assistant Examiner* — Dapinder Singh
(74) *Attorney, Agent, or Firm* — Hunton Andrews Kurth LLP

(57) ABSTRACT

A Rankine cycle system includes a boiler configured to apply waste heat to refrigerant circulating in an internal-combustion engine to vaporize the refrigerant; a gas-liquid separator configured to separate gas-liquid two-phase refrigerant, sent from the boiler, into gas phase fluid and liquid phase fluid; a superheater configured to superheat the gas phase fluid, sent from the gas-liquid separator, through heat exchange with exhaust gas of the internal-combustion engine; an expander configured to expand the gas phase fluid, passing through the superheater, to recover thermal energy, and a condenser configured to condense the gas phase fluid, passing through the expander, to return the gas phase fluid to liquid phase fluid. The gas-liquid separator is connected to the internal combustion engine via a refrigerant pipe. The internal combustion engine is fixed onto an engine
(Continued)

mount of a vehicle. The gas-liquid separator is fixed to the internal combustion engine via a bracket.

4 Claims, 4 Drawing Sheets

(58) Field of Classification Search
USPC .......................................... 60/611, 618, 670
See application file for complete search history.

(56) References Cited

U.S. PATENT DOCUMENTS

| | | |
|---|---|---|
| 4,696,261 A | 9/1987 | Hayashi |
| 2004/0163611 A1* | 8/2004 | Raikio .................... F02B 47/10 123/25 A |
| 2013/0008165 A1 | 1/2013 | Yamada et al. |
| 2014/0250889 A1 | 9/2014 | Mizoguchi et al. |

FOREIGN PATENT DOCUMENTS

| | | |
|---|---|---|
| JP | S57099222 A | 6/1982 |
| JP | S60134818 U | 9/1985 |
| JP | H07259548 A | 10/1995 |
| JP | 2001182504 A | 7/2001 |
| JP | 2002-316530 A | 10/2002 |
| JP | 2003314279 A | 11/2003 |
| JP | 2008286022 A | 11/2008 |
| JP | 2009108794 A | 5/2009 |
| JP | 2011-189824 A | 9/2011 |
| JP | 2012159065 A | 8/2012 |
| JP | 2013076369 A | 4/2013 |
| JP | 2014092042 A | 5/2014 |
| JP | 2015-094271 A | 5/2015 |

OTHER PUBLICATIONS

United States Patent and Trademark Office, Notice of Allowance issued to U.S. Appl. No. 15/335,987 dated Oct. 4, 2018, 26 pages.
United States Patent and Trademark Office, Corrected Notice of Allowability issued to U.S. Appl. No. 15/335,987 dated Dec. 31, 2018, 6 pages.

* cited by examiner

RANKINE CYCLE SYSTEM FOR VEHICLE

CROSS-REFERENCE TO RELATED APPLICATION

The present application claims priority to Japanese Patent Application No. 2015-244961 filed on Dec. 16, 2015, which is incorporated herein by reference in its entirety.

TECHNICAL FIELD

Embodiments of the present invention relate to a Rankine cycle system for vehicle, and more specifically, to a structure for mounting a Rankine cycle system on a vehicle.

BACKGROUND

Patent Literature 1 discloses a technology regarding a Rankine cycle system mounted on a vehicle. In this Rankine cycle system, a liquid-phase fluid is boiled with waste heat of an engine into a gas-phase fluid. Work is taken out by allowing the gas-phase fluid to expand. The gas-phase fluid after the expansion is condensed and returned to the liquid-phase fluid.

Following is a list of patent literatures which the applicant has noticed as related arts of embodiments the present invention.

Patent Literature 1: JP 2015-94271 A
Patent Literature 2: JP 2002-316530 A
Patent Literature 3: JP 2011-189824 A

SUMMARY

The Rankine cycle system has a structure in which its constituents are connected to one another with pipes and the like. In particular, to a gas-liquid separator, which is one of the constituents of the Rankine cycle system, pipes are provided which allow transfer of a refrigerant from/to system's constituents including an internal combustion engine. Therefore, in the case where the gas-liquid separator is fixed, for example, to the vehicle side, vibration of the internal combustion engine is caused to be transmitted to the vehicle via the pipe connecting the internal combustion engine to the gas-liquid separator. The aforementioned technology can be still improved in view of suppression of vibration of the vehicle since, in this technology, the Rankine cycle system is not sufficiently considered on a structure for mounting it on a moving object such as a vehicle.

The present invention is devised in view of the aforementioned problem and an object thereof is to provide a Rankine cycle system for vehicle capable of suppressing vibration of an internal combustion engine from being directly transmitted from a gas-liquid separator to a vehicle.

In order to achieve the aforementioned object, there is provided a Rankine cycle system for vehicle according to a first embodiment of the present invention, including: a boiler configured to apply waste heat to refrigerant circulating in an internal-combustion engine to vaporize the refrigerant; a gas-liquid separator configured to separate gas-liquid two-phase refrigerant, sent from the boiler, into gas phase fluid and liquid phase fluid; a superheater configured to superheat the gas phase fluid, sent from the gas-liquid separator, through heat exchange with exhaust gas of the internal-combustion engine; an expander configured to expand the gas phase fluid, passing through the superheater, to recover thermal energy; and a condenser configured to condense the gas phase fluid, passing through the expander, to return the gas phase fluid to liquid phase fluid, wherein the gas-liquid separator is connected to the internal combustion engine via a refrigerant pipe, the internal combustion engine is fixed onto an engine mount of a vehicle, and the gas-liquid separator is fixed to the internal combustion engine via a bracket.

According to a second embodiment of the present invention, in the first embodiment, the gas-liquid separator is connected to the superheater via a refrigerant pipe, and the superheater is fixed to the internal combustion engine.

According to a third embodiment of the present invention, in the second embodiment, the superheater is connected to the expander via a refrigerant pipe, and the expander is fixed to the internal combustion engine.

According to a fourth embodiment of the present invention, in the second embodiment, the superheater is integrally configured with an exhaust gas manifold fixed to the internal combustion engine.

According to the first embodiment, the internal combustion engine is fixed to the engine mount, and the gas-liquid separator is fixed to the internal combustion engine via the bracket. Vibration of the internal combustion engine is transmitted to the gas-liquid separator via the refrigerant pipe. Therefore, according to this embodiment, vibration of the internal combustion engine can be prevented from being directly transmitted from the gas-liquid separator to the vehicle since the gas-liquid separator is fixed to the internal combustion engine.

According to the second embodiment, the superheater connected to the gas-liquid separator with the refrigerant pipe is fixed to the internal combustion engine. Therefore, according to this embodiment, vibration transmitted to the superheater via the refrigerant pipe can be prevented from being directly transmitted to the vehicle.

According to the third embodiment, the expander connected to the superheater with the refrigerant pipe is fixed to the internal combustion engine. Therefore, according to this embodiment, vibration transmitted to the expander via the refrigerant pipe can be prevented from being directly transmitted to the vehicle.

According to the fourth embodiment, the superheater is integrally configured with the exhaust gas manifold fixed to the internal combustion engine. Therefore, according to this embodiment, vibration of the internal combustion engine can be prevented from being directly transmitted from the superheater to the vehicle.

DESCRIPTION OF EMBODIMENTS

Hereafter, embodiments of the present invention are described with reference to the drawings. Common elements across the drawings are given the same reference signs and duplicated description of those is omitted. In the following embodiments, when numerical values are mentioned such as the quantity of each element, the number thereof, the amount thereof and the range thereof, any of the mentioned numerical values does not limit the invention except that it is particularly explicitly presented or it is definitely specified so in principle. Any of the following structures described in the embodiments is not always necessary for the invention except that it is particularly explicitly presented or it is definitely specified so in principle.

First Embodiment

1. Configuration of Rankine Cycle System

Figure 1:
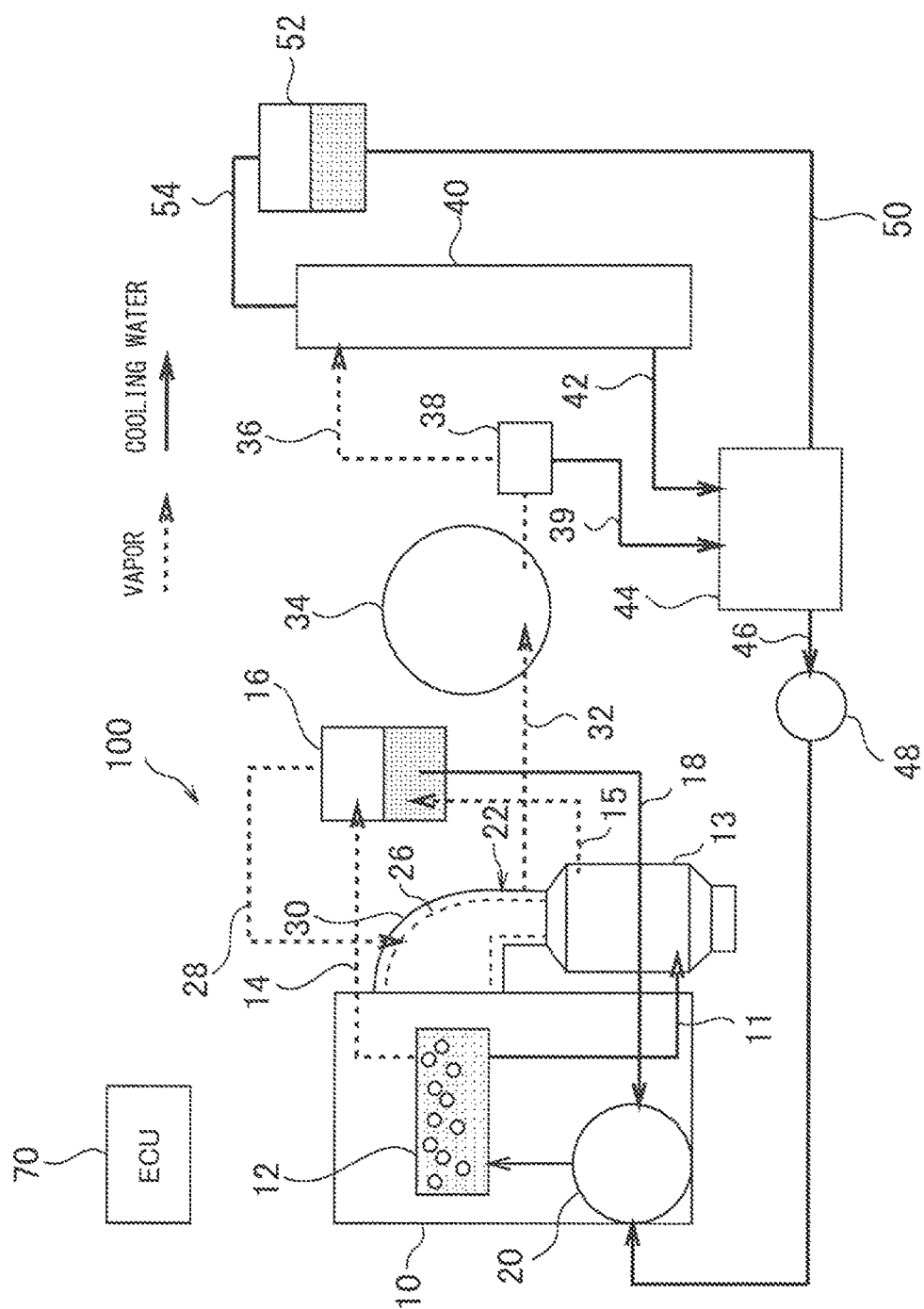
FIG. 1 is a diagram illustrating a configuration of a Rankine cycle system of a first embodiment of the present invention.

FIG. 1 is a diagram illustrating a configuration of a Rankine cycle system 100 of a first embodiment. The Rankine cycle system 100 of the first embodiment is a Rankine cycle system for vehicle which includes an internal combustion engine (engine) 10 and is mounted on a vehicle. The engine 10 is not limited in its type and structure except that the engine 10 has, at its cylinder blocks and cylinder heads, a refrigerant flow channel 12 which a refrigerant circulated in the engine 10 flows through. The refrigerant flow channel 12 includes a water jacket surrounding the cylinders. The engine 10 is cooled through heat exchange with the refrigerant flowing through the refrigerant flow channel 12. In the present embodiment, water is used as the refrigerant.

The refrigerant flowing through the refrigerant flow channel 12 is boiled with waste heat of the engine 10 and a part thereof is vaporized. The engine 10 is thus cooled. Namely, the refrigerant flow channel 12 serves as a boiler which boils the liquid-phase refrigerant flowing therethrough with the heat of the engine 10. The configuration of the refrigerant flow channel 12 is not specially limited as long as the refrigerant can pass through inside the engine 10. The refrigerant, which passes through the refrigerant flow channel 12, is not limited to water but may be a liquid-phase fluid at ambient temperature that is boiled into a gas-phase fluid with heat of the engine 10.

The refrigerant flow channel 12 of the engine 10 is connected to a gas-liquid separator 16 via a refrigerant pipe 14. After the refrigerant is boiled with heat of the engine 10, a liquid-phase fluid and a gas-phase fluid are ejected from the refrigerant flow channel 12. The gas-liquid separator 16 separates the refrigerant in gas-liquid two phases which flows into the gas-liquid separator 16, into the liquid-phase fluid and the gas-phase fluid. The gas-liquid separator 16 is connected to a first water pump 20 via a refrigerant pipe 18. The liquid-phase fluid separated by the gas-liquid separator 16 flows into the first water pump 20 through the refrigerant pipe 18 and is sent to the refrigerant flow channel 12 by the first water pump 20.

The Rankine cycle system 100 includes an exhaust gas heat recovery unit 13. The refrigerant flow channel 12 is also connected to the exhaust gas heat recovery unit 13 via a refrigerant pipe 11. Into the exhaust gas heat recovery unit 13, the liquid-phase fluid is introduced from the refrigerant flow channel 12. The introduced liquid-phase fluid is superheated through heat exchange with exhaust gas flowing through an exhaust gas passage 22 to be boiled, and a part thereof is vaporized. The vaporized gas-phase fluid is introduced into the gas-liquid separator 16 via a refrigerant pipe 15.

The gas-liquid separator 16 is connected to a superheater 30 via a refrigerant pipe 28. The superheater 30 is provided upstream of the exhaust gas heat recovery unit 13 on the exhaust gas passage 22 of the engine 10. More in detail, the superheater 30 circumferentially covers an exhaust gas manifold 26 and is integrated with the exhaust gas manifold 26. A space surrounded by the inner wall surface of the superheater 30 and the outer wall surface of the exhaust gas manifold 26 is a flow channel which the gas-phase fluid sent from the gas-liquid separator 16 flows through. In the gas-liquid separator 16, the gas-phase fluid is saturated vapor since the gas-phase fluid is present along with the liquid-phase fluid. The gas-phase fluid entering the superheater 30 becomes superheated vapor after absorbing exhaust gas heat transmitted through the wall surface of the exhaust gas manifold 26.

The superheater 30 is connected to a turbine 34 which is an expander via a refrigerant pipe 32. In the turbine 34, thermal energy is recovered by allowing the gas-phase fluid (superheated vapor) sent from the superheater 30 to expand. A not-shown supersonic nozzle is provided at a connection between the refrigerant pipe 32 and the turbine 34. The gas-phase fluid is ejected into the turbine 34 from the supersonic nozzle to rotate the turbine 34. The rotation of the turbine 34 is transmitted to an output shaft of the engine 10 via a not-shown reduction gear. Namely, the thermal energy recovered through the turbine 34 assists the engine 10. The turbine 34 may drive a generator instead to store the generated electricity in a power storage.

The gas-phase fluid expanded in the turbine 34 is sent to a condenser 40 via a refrigerant pipe 36. A liquid-phase fluid, which can be generated through condensation of the gas-phase fluid in the middle of the refrigerant pipe 36, is temporarily stored in a condensed water tank 38 provided in the middle of the refrigerant pipe 36. The condensed water tank 38 is connected to a catch tank 44 mentioned later via a refrigerant pipe 39. The gas-phase fluid sent to the condenser 40 is cooled and condensed by the condenser 40 to be returned to a liquid-phase fluid. The liquid-phase fluid generated through the condensation of the gas-phase fluid is sent to the catch tank 44 from the condenser 40 via a refrigerant pipe 42, and is temporarily stored in the catch tank 44. The catch tank 44 is connected to the first water pump 20 via a refrigerant pipe 46. A second water pump 48 is provided on the refrigerant pipe 46. The second water pump 48 sends the liquid-phase fluid stored in the catch tank 44 to the first water pump 20. A not-shown check valve is provided between the second water pump 48 and the gas-liquid separator 16 to prevent the liquid-phase fluid from flowing back from the gas-liquid separator 16 side to the catch tank 44 side. The refrigerant pipe 46 may connect the catch tank 44 to the middle of refrigerant pipe 18 instead. In this configuration, drive of the second water pump 48 sends the liquid-phase fluid stored in the catch tank 44 to the gas-liquid separator 16 and the engine 10. The lower end of the catch tank 44 is connected to the lower end of a refrigerant tank 52 via a refrigerant pipe 50. To the upper end of the refrigerant tank 52, a refrigerant pipe 54 is connected whose end is connected to the upper end of the condenser 40.

The Rankine cycle system 100 includes an electronic control unit (ECU) 70 as a controller. The ECU 70 at least includes an I/O interface, a memory and a processor (CPU). The I/O interface is provided for taking in sensor signals from sensors attached to the Rankine cycle system 100 or the engine 10 having the same mounted, and for outputting operation signals to actuators included in the Rankine cycle system 100. The memory stores control programs, maps and the like. The CPU reads and executes the control program or the like from the memory, and generates the operation signals for the actuators on the basis of the taken-in sensor signals.

2. Structure for Mounting Rankine Cycle System on Vehicle

The Rankine cycle system 100 is mounted inside an engine compartment of a vehicle for accommodating the engine 10. The engine 10 is fixed onto an engine mount in the engine compartment. The engine mount absorbs the vibration of the engine 10, and can suppress the vibration from being transmitted from the engine 10 to the vehicle side.

There are various restrictions in arranging the constituents of the Rankine cycle system 100 due to the limited space in the engine compartment for mounting them. Meanwhile, the gas-liquid separator 16, which is one of the constituents of the Rankine cycle system 100, needs a relatively large volume for stably supplying the vapor. Only in view of the space for mounting the gas-liquid separator 16, it should be disposed at a place apart from the engine 10. As a result, it is also supposed that the gas-liquid separator 16 be fixed onto the vehicle body side.

Vibration of the engine 10 is caused to be transmitted to the vehicle via the refrigerant pipe 14 when the gas-liquid separator 16 is directly fixed to a member constituting the vehicle framework since the gas-liquid separator 16 is connected to the refrigerant flow channel 12 of the engine 10 via the refrigerant pipe 14 as mentioned above. In particular, there is typically used a metal-made, large-diameter pipe to pass a gas-phase fluid (vapor) as well as a liquid-phase fluid, such as the refrigerant pipe 14, for its heat resistance and pressure resistance. Use of such a pipe increases vibration transmitted from the engine 10 to the gas-liquid separator 16, which results in large vibration to be transmitted to the vehicle.

Therefore, the inventors in the present application have been intensively studying structures for mounting the gas-liquid separator 16 on the vehicle in order to suppress vibration transmitted, not via the engine mount, from the engine 10 to the vehicle. The inventors in the present application have eventually found the structure for mounting the gas-liquid separator 16 on the vehicle, which structure will be described below.

2-1. Structure for Fixing Gas-Liquid Separator

Figure 2A:
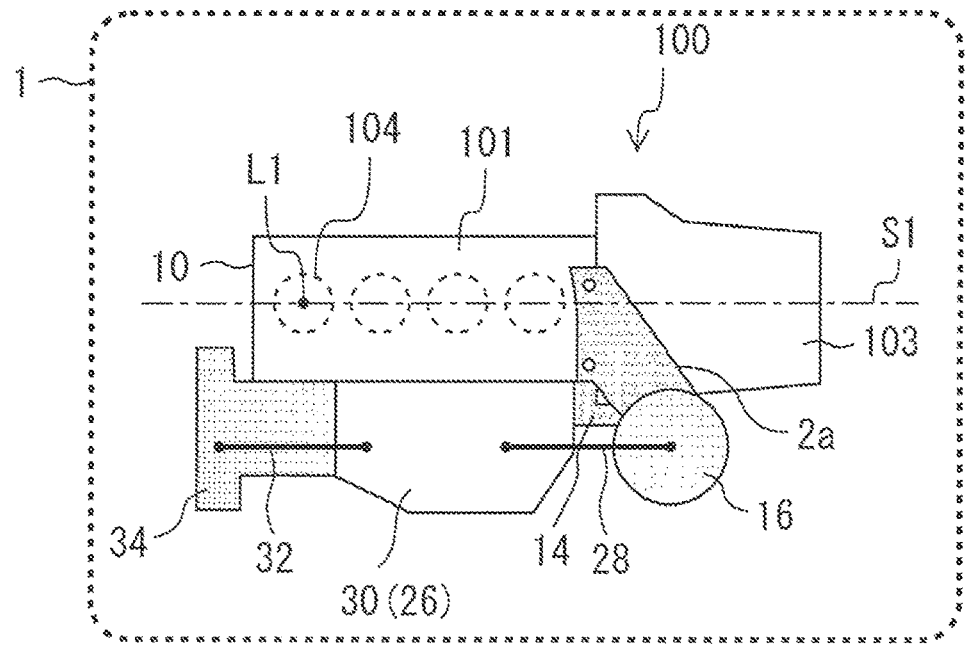
FIGS. 2A and 2B are schematic diagrams for explaining a structure for fixing a gas-liquid separator.
Figure 2B:
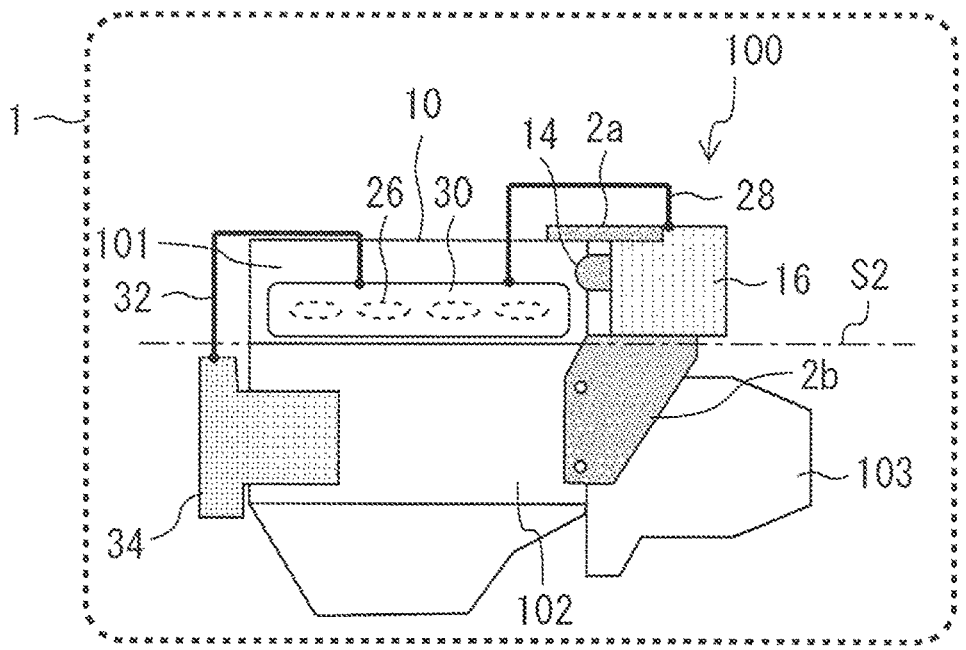

FIGS. 2A and 2B are schematic diagrams for explaining a structure for fixing the gas-liquid separator 16. FIG. 2A is a diagram of the Rankine cycle system in plan view above the vehicle. FIG. 2B is a diagram of the Rankine cycle system mounted on the vehicle in elevation view beside the vehicle. In FIGS. 2A and 2B, elements other than the main constituents of the Rankine cycle system 100 are omitted. As illustrated in FIGS. 2A and 2B, the Rankine cycle system 100 is mounted inside an engine compartment 1 of the vehicle. The engine 10 is mounted on the engine mount (not shown) provided in the engine compartment 1.

Reference sign S1 in FIG. 2A denotes a plane which includes center axes L1 of cylinders 104 and is parallel to the direction of the cylinders 104 lining up which are provided in series along the longitudinal direction of a cylinder block 102. Reference sign S2 in FIG. 2B denotes a plane on which a cylinder head 101 meets the cylinder block 102. In the following description, "exhaust side" designates the exhaust side, of the engine 10 relative to the plane S1, on which the exhaust gas passage 22 is provided, and "air intake side" designates the air intake side of the engine 10 relative to the plane S1.

In the fixing structure illustrated in FIG. 2, a transmitter 103 is fixed onto a lateral face of the cylinder block 102. The gas-liquid separator 16 is disposed in a space which is on the exhaust side (that is, the side of the exhaust gas passage 22 of the engine 10) above the transmitter 103, and is fixed to the engine 10 via brackets 2a and 2b. More in detail, one end of the bracket 2a is fixed to the upper part of the gas-liquid separator 16 and the other end thereof is fixed onto the upper face of the cylinder head 101 of the engine 10. Moreover, one end of the bracket 2b is fixed to the lower part of the gas-liquid separator 16 and the other end thereof is fixed onto a lateral face of the cylinder block 102 of the engine 10. The brackets 2a and 2b are formed by processing metal plates, and each of them has a shape which can secure strength needed for fixing the gas-liquid separator 16. With bolts, the brackets 2a and 2b are fixed to the engine 10 and the brackets 2a and 2b are fixed to the gas-liquid separator 16.

According to the aforementioned structure for fixing the gas-liquid separator 16, the gas-liquid separator 16 is fixed to the engine 10. This can prevent direct transmission of the vibration to the vehicle, the vibration having been transmitted to the gas-liquid separator 16 via the refrigerant pipe 14. Hence, vibration of the vehicle can be suppressed. Moreover, the gas-liquid separator 16 can be effectively suppressed from shaking since the gas-liquid separator 16 is fixed at its upper part and lower part with the brackets 2a and 2b.

A method of fixing the brackets, the number thereof and the shape thereof are not limited as long as the brackets 2a and 2b can be fixed to the engine 10. The material of the brackets 2a and 2b is not limited to metal. The material preferably has high strength since they fix the gas-liquid separator 16, which is typically heavy.

2-2. Structure for Fixing Superheater

As mentioned above, transmission of the vibration to the vehicle can be suppressed since the gas-liquid separator 16 is fixed to the engine 10 in the Rankine cycle system 100 of the first embodiment. Now, as illustrated in FIG. 2, refrigerant pipes other than the refrigerant pipe 14 are also connected to the gas-liquid separator 16. For example, the refrigerant pipe 28 connects the gas-liquid separator 16 and the superheater 30 together. Via the refrigerant pipe 28, the vibration transmitted to the gas-liquid separator 16 is transmitted also to the superheater 30. Depending on a structure for fixing the superheater 30, vibration of the vehicle can be further suppressed.

With this point being in mind, the superheater 30 is integrated with the exhaust gas manifold 26 in the Rankine cycle system 100 of the first embodiment. The exhaust gas manifold 26 is fixed to the engine 10. The vibration, of the gas-liquid separator 16, transmitted to the superheater 30 via the refrigerant pipe 28 is not directly transmitted to the vehicle. According to the aforementioned structure for fixing the superheater 30, vibration of the vehicle can be further suppressed.

The shape or the structure of the superheater 30 is not limited as long as it can be fixed to the engine 10. Namely, the superheater 30 may be integrated, for example, with another portion which can absorb the exhaust gas heat, such as a catalyst, not limited to the structure of being integrated with the exhaust gas manifold 26. Otherwise, it may also be fixed to the engine 10 at any place where it can absorb the exhaust gas heat.

2-3. Structure for Fixing Turbine

As mentioned above, transmission of the vibration to the vehicle can be suppressed since the gas-liquid separator 16 and the superheater 30 are fixed to the engine 10 in the Rankine cycle system 100 of the first embodiment. Now, as illustrated in FIG. 2, the superheater 30 is connected to the turbine 34 via the refrigerant pipe 32. Via the refrigerant pipe 32, the vibration transmitted from the gas-liquid separator 16 to the superheater 30 is transmitted to the turbine 34. Depending on a structure for fixing the turbine 34, vibration of the vehicle can be further suppressed.

With this point being in mind, the turbine 34 is fixed to the engine 10 in the Rankine cycle system 100 of the first embodiment. According to such a structure, the vibration transmitted to the turbine 34 from the superheater 30 through the refrigerant pipe 32 is not directly transmitted to the vehicle. According to the aforementioned structure for fixing the turbine 34, vibration of the vehicle can be further suppressed. The structure for fixing the turbine 34 is not limited as long as it can be fixed to the engine 10.

3. Example of Structure for Mounting Rankine Cycle System 100 on Vehicle

Figure 3:
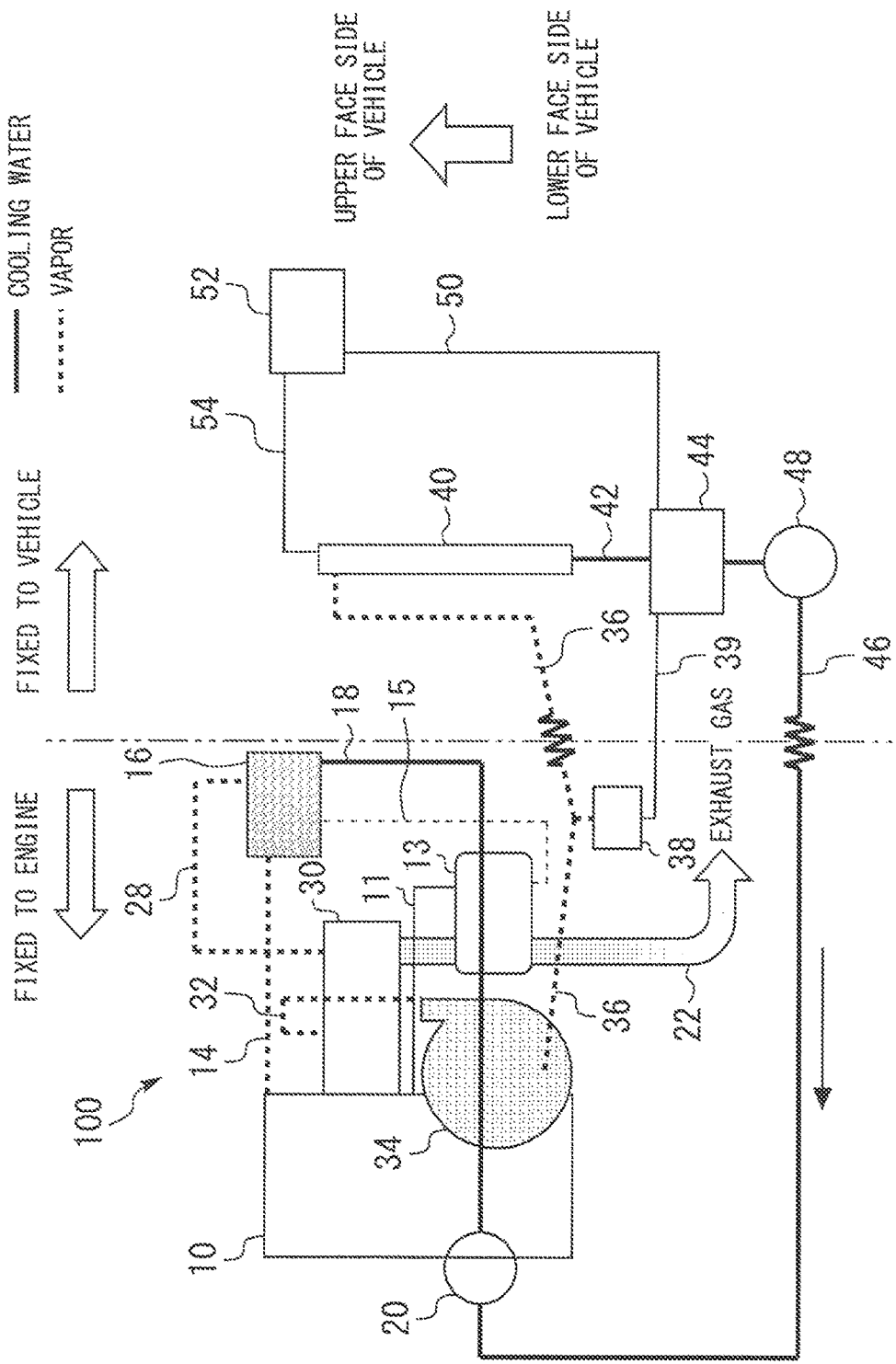
FIG. 3 is a diagram for explaining a structure for mounting the Rankine cycle system having the gas-liquid separator fixed to an engine on a vehicle.
Figure 4:
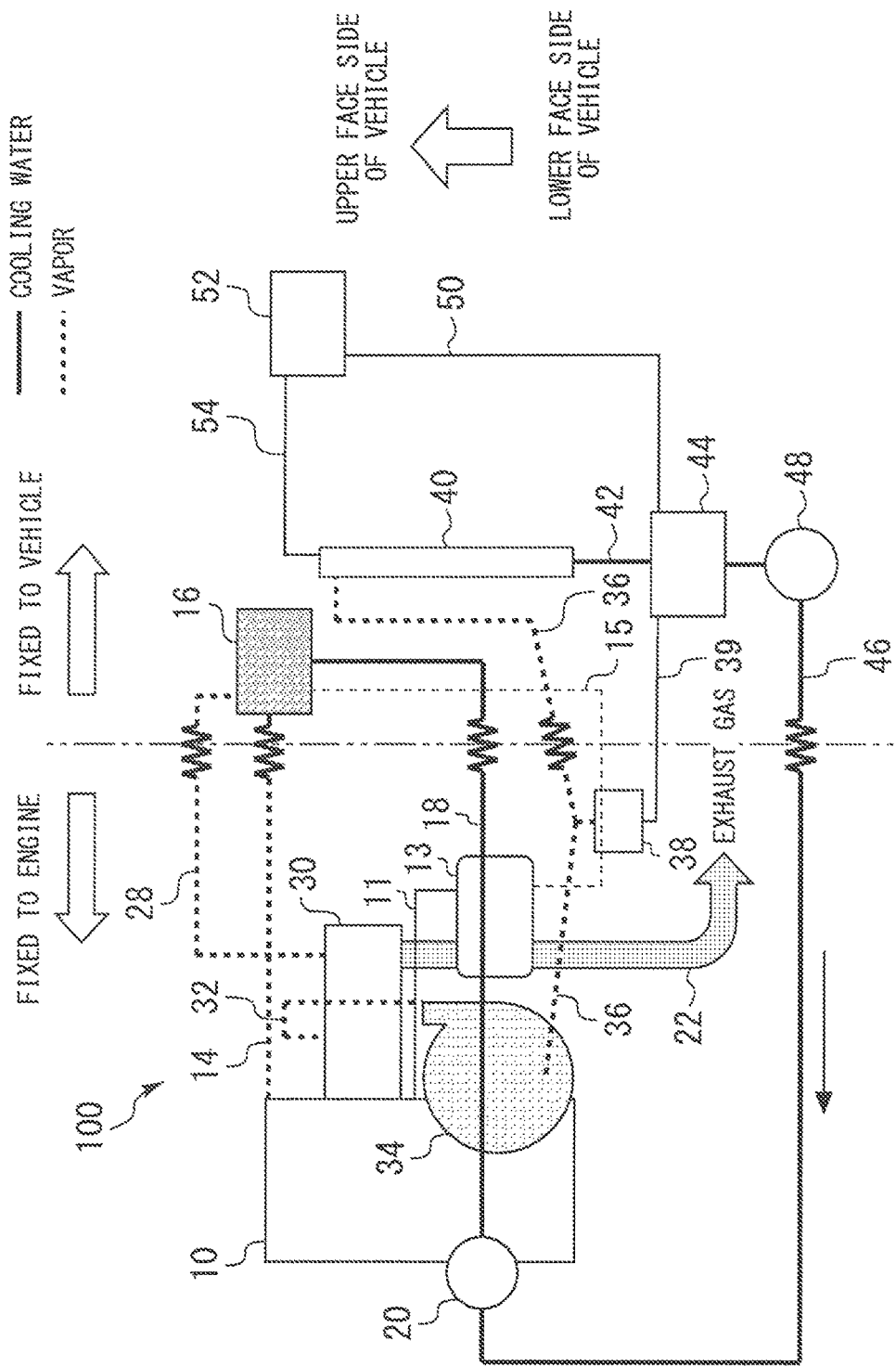
FIG. 4 is a diagram for explaining a structure for mounting the Rankine cycle system having the gas-liquid separator fixed to the vehicle on the vehicle.

Next, the structure for mounting the Rankine cycle system 100 of the first embodiment on the vehicle is described along with a comparative example. FIG. 3 is a diagram for explaining a structure for mounting a Rankine cycle system in which a gas-liquid separator is fixed to an engine on a vehicle. FIG. 4 is a diagram for explaining a structure for mounting a Rankine cycle system in which a gas-liquid separator is fixed to a vehicle, on the vehicle. FIG. 3 corresponds to the structure for mounting the Rankine cycle system 100 of the first embodiment of the present invention on the vehicle. FIG. 4 corresponds to a comparative example of the Rankine cycle system 100 of the first embodiment of the present invention. Each of FIG. 3 and FIG. 4 schematically illustrates an arrangement of the constituents of the Rankine cycle system in side view beside the vehicle. Moreover, in FIG. 3 and FIG. 4, elements other than the main constituents of the Rankine cycle system are omitted.

3-1. Discussion of Comparative Example

In the comparative example illustrated in FIG. 4, the gas-liquid separator 16 is fixed to the vehicle while the superheater 30 and the turbine 34 are fixed to the engine 10. In such a structure, the vibration of the engine 10, which vibration is further transmitted to the gas-liquid separator 16 via the refrigerant pipes 14, 28 and 18, is caused to be transmitted, not via the engine mount, to the vehicle, which results in larger vibration of the vehicle.

3-2. Discussion of Vehicle Mounting Structure of First Embodiment

On the contrary, in the vehicle mounting structure illustrated in FIG. 3, the gas-liquid separator 16 is fixed to the engine 10. In such a structure, there is no path through which the vibration is directly transmitted from the gas-liquid separator 16 to the vehicle body. The Rankine cycle system of the embodiment can reduce paths through which the vibration is transmitted between the engine 10 and the vehicle more than the Rankine cycle system of the comparative example. Therefore, vibration of the vehicle can be effectively suppressed.

What is claimed is:

1. A Rankine cycle system for vehicle comprising:
a boiler configured to apply waste heat to refrigerant circulating in an internal-combustion engine to vaporize the refrigerant;
a gas-liquid separator configured to separate gas-liquid two-phase refrigerant, sent from the boiler, into gas phase fluid and liquid phase fluid;
a superheater configured to superheat the gas phase fluid, sent from the gas-liquid separator, through heat exchange with exhaust gas of the internal-combustion engine;
an expander configured to expand the gas phase fluid, passing through the superheater, to recover thermal energy; and
a condenser configured to condense the gas phase fluid, passing through the expander, to return the gas phase fluid to liquid phase fluid, wherein
the gas-liquid separator is connected to the internal combustion engine via a refrigerant pipe,
the internal combustion engine is fixed onto an engine mount of a vehicle, and the gas-liquid separator is fixed to the internal combustion engine via a bracket,
wherein the bracket includes a first bracket being fixed onto the upper face of the cylinder head of the internal combustion engine and a second bracket being fixed onto a lateral face of the cylinder block of the internal combustion engine,
wherein the upper part of the gas-liquid separator is fixed to the first bracket and the lower part of the gas-liquid separator is fixed to the second bracket.

2. The Rankine cycle system for vehicle according to claim 1, wherein the gas-liquid separator is connected to the superheater via a refrigerant pipe, and the superheater is fixed to the internal combustion engine.

3. The Rankine cycle system for vehicle according to claim 2, wherein the superheater is connected to the expander via a refrigerant pipe, and the expander is fixed to the internal combustion engine.

4. The Rankine cycle system for vehicle according to claim 2, wherein the superheater is integrally configured with an exhaust gas manifold fixed to the internal combustion engine.

\* \* \* \* \*